No. 778,438. PATENTED DEC. 27, 1904.
W. L. BARKER.
RAILWAY CAR BRAKE.
APPLICATION FILED JULY 18, 1903. RENEWED MAY 6, 1904.
2 SHEETS—SHEET 1.
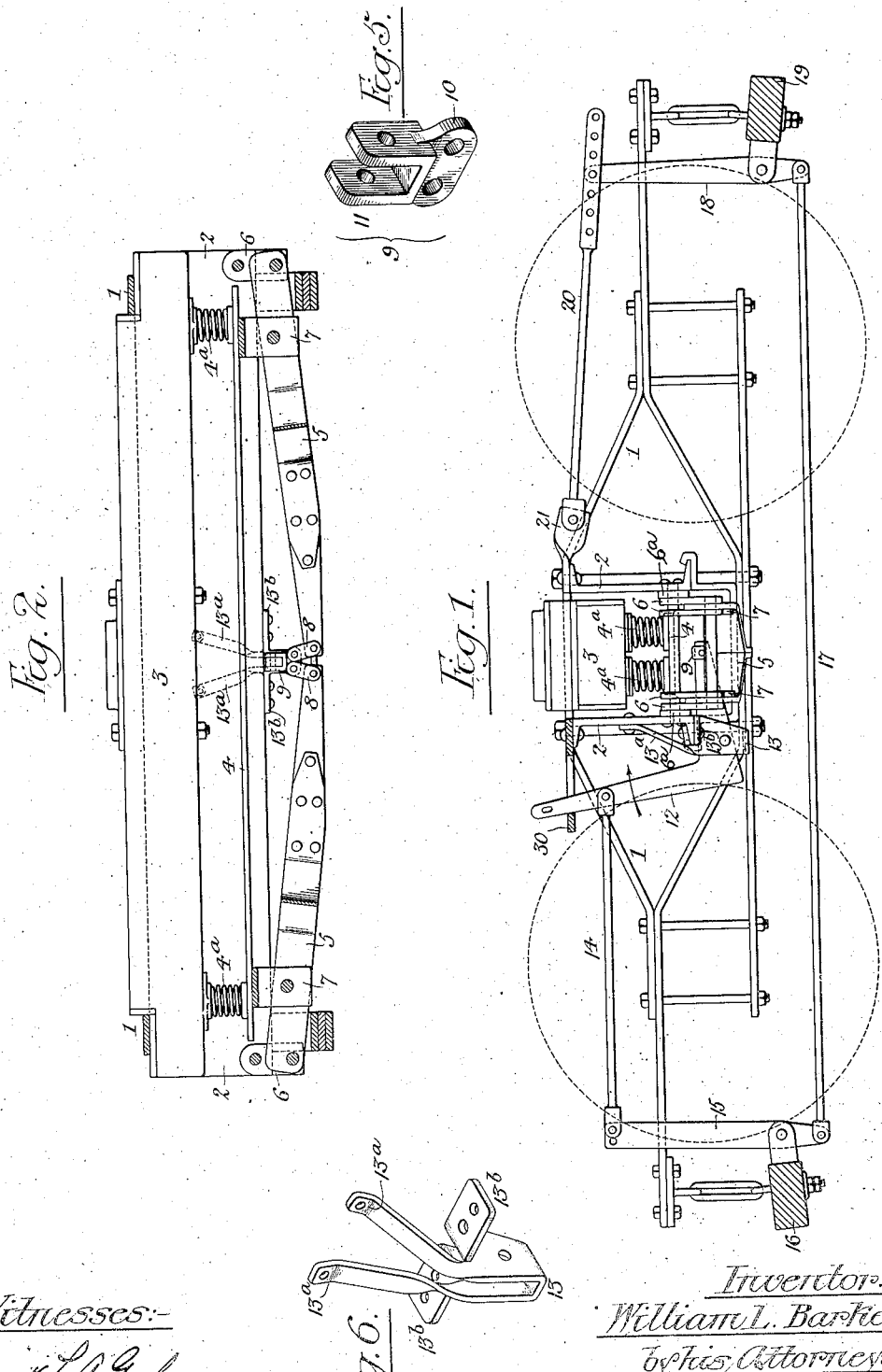

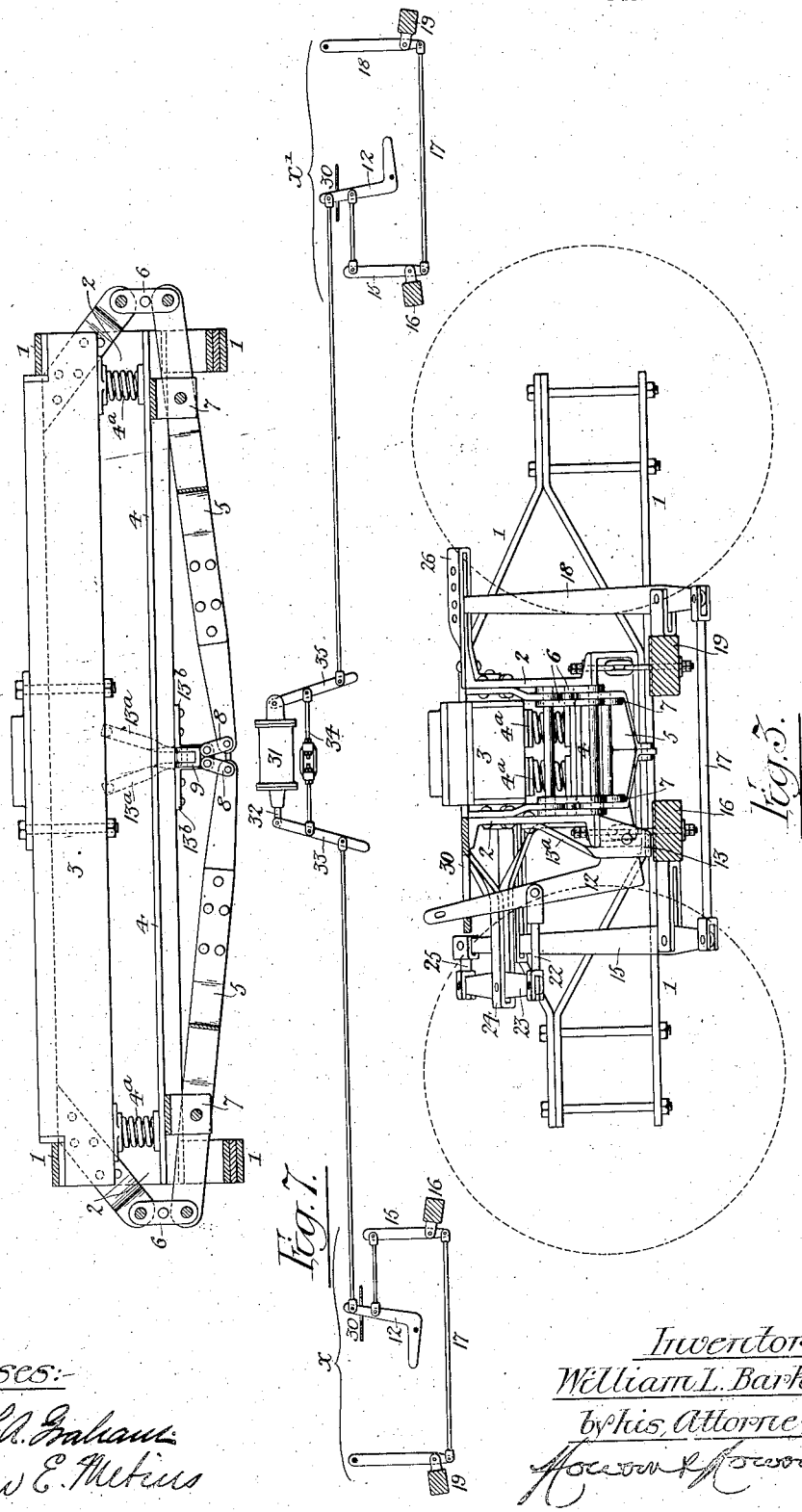

No. 778,438. Patented December 27, 1904.

UNITED STATES PATENT OFFICE.

WILLIAM L. BARKER, OF ASHBOURNE, PENNSYLVANIA.

RAILWAY-CAR BRAKE.

SPECIFICATION forming part of Letters Patent No. 778,438, dated December 27, 1904.

Application filed July 18, 1903. Renewed May 6, 1904. Serial No. 206,760.

*To all whom it may concern:*

Be it known that I, WILLIAM L. BARKER, a citizen of the United States, residing in Ashbourne, Pennsylvania, have invented certain Improvements in Railway-Car Brakes, of which the following is a specification.

The object of my invention is to provide a braking device for railway-cars which will automatically adjust itself, so as to apply the brakes to the wheels of each truck of each car or vehicle of a train according to the respective weight borne by said truck in order that the resistance offered to the motion of the vehicle may be proportional to its momentum, which is the product of its mass and velocity, thereby rendering it possible to properly brake a mixed train of light cars and loaded cars, whose burden varies from maximum to minimum, and also to effectually guard against the skidding of wheels and to have under control at all times and under all circumstances a maximum braking or retarding effect for instantaneous application should occasion require. The automatic application of the brake is so controlled that besides being susceptible of perfect graduation the brakes may be administered first to the wheels of the truck sustaining the greatest weight, then to the wheels of the truck carrying the next lighter load, then to the next, and so on until the lightest is last reached in order that the resistance may be first offered where momentum is greatest and last where it is least, there being, therefore, no retardation of the movement of the lighter-loaded trucks until the heavier-loaded ones have been retarded to the extent of their excess momenta. By this means I prevent disturbance of the train's equipoise due to the varying distribution of weight in the train and consequent varying momenta of its different members.

My improved braking device also provides for the automatic application of the brakes should the train part or the air-supply become exhausted or prove insufficient. It avoids the difficulty of getting away from stations owing to the sticking of some part of the braking mechanism, and it is interchangeable with other prevailing systems which reduce or exhaust the train-pipe pressure in order to apply the brakes.

In the accompanying drawings, Figure 1 is a side elevation, partly in section, illustrating the application of my invention to a car-truck having the brake-beams disposed outside of the wheels, one of the side frames of the truck being removed. Fig. 2 is a transverse section of the truck, partly in elevation. Fig. 3 is a view similar to Fig 1, but illustrating the application of my invention to a car-truck having the brake-beams between the front and rear wheels. Fig. 4 is a view of said truck, partly in transverse section and partly in elevation. Figs. 5 and 6 are perspective views, on an enlarged scale, of elements of the device; and Fig. 7 is a diagram illustrating one of the features of the invention.

Referring first to Figs. 1 and 2 of the drawings, 1 1 represent the side frames of the truck, and 2 the transverse bars or transoms, these bars 1 and 2 being rigidly secured together and constituting the rigid frame of the truck.

The truck-bolster 3, upon which the body of the car is supported, is mounted upon springs 4ª, which rest upon a transverse spring-plank 4. This spring-plank is mounted upon a pair of levers 5, each forked at its outer end, as shown in Fig. 1, and each leg of said fork is suspended by depending links 6 from the outer ends of the transoms 2, suitable depending brackets 7 on the spring-plank serving to pivotally connect the latter to the forked end of each lever 5. These depending brackets are in the present instance formed by sections of channel-bar rigidly secured to the spring-plank at points adjacent to the springs, the swinging links 6, whereby the outer ends of the levers are hung to the transom, providing for the necessary lateral movement of said ends as the levers swing, and thus permitting the brackets 7 to travel in direct vertical lines, so as to impart no lateral strain either to the spring-plank or levers. By forking the levers at their outer ends a broad bearing is obtained and the stability of each lever as regards its capacity for resisting twisting strains is insured.

Between each transom 2 and the pivotal upper end of the outer link 6 is inserted a reinforcing-plate 6ᵃ, as shown in Fig. 1, which is securely riveted to the transom A and is, like the latter, perforated for the passage of the bolt upon which the links 6 are pivoted. This plate has a threefold purpose—first, to lend additional strength to the web of the channel-bar or transom at the point which receives the pivot-bolt for the links; secondly, to insure such lateral separation of the outer link from the transom as will permit it to swing clear of the casting upon which the transom is supported and which sometimes has a lip bearing upon the inner face of the transom-web, and, thirdly and chiefly, as a fixed check or stop to limit the lateral movement of the spring-plank. In running around curves, where the outside rails are elevated, the tendency of the movable members of the truck is to swing toward the inner rail. Movement of the bolster is prevented by contact of its shoulders with the side frames 1; but in the absence of the reinforcing-plates 6ᵃ the motion of the spring-plank will only be resisted by contact with the links 6, which is objectionable.

By terminating the spring-plank just within the inner sides of the reinforcing-plates, however, said plates serve to resist lateral movement of the spring-plank without materially affecting its vertical play.

The inner ends of the levers 5 are connected, by means of links 8, to what I term a "triple coupler" 9, as shown on an enlarged scale in Fig. 5, and consisting of a web 10, with eyes for the reception of pins at the upper ends of the links 8, this web having at the top a pair of jaws 11 for the reception of the inner end of the lower arm of a bell-crank lever 12, which is hung to a depending looped strap 13, secured to one of the transoms 2, said strap having upwardly-projecting members 13ᵃ, secured to the sides of the transom, and laterally-extending members 13ᵇ, secured to the bottom of the same. This lever 12 I term the "primary" lever.

The strain upon the pivotal support of the lever 12 is the result of the vertical push upon the longitudinally-extending arm of the lever and the longitudinal pull upon the upwardly-extending arm of the same. Hence this strain tends to thrust the pivotal support diagonally downward, and the better to resist this thrust the upwardly-extending members 13ᵃ of the strap 13 are provided.

The upper end of the lever 12 plays in a slotted plate 30, secured to one of the transom-bars 2, and said lever is connected by a rod 14 to the upper end of the live lever 15 of the braking mechanism, which is hung to jaws on one of the brake-beams 16, the lower end of said lever 15 being connected by a rod 17 to the lower end of a dead lever 18, which is hung to jaws on the other brake-beam 19 and is fulcrumed upon the upper end of a rod 20, hung to a suitable bearing 21 on one of the transom-bars 2.

In that embodiment of my invention shown in Fig. 3 the lever 12 is not connected directly to the live lever 15 of the braking mechanism, but is connected by a rod 22 to a lever 23, hung to a yoke 24, projecting from one of the transoms of the truck, this lever being connected by a rod 25 to the live lever 15. In this truck also the upper end of the dead lever 18 is pivoted to a yoke 26 instead of to the outer end of a rod 20, as in the truck shown in Fig. 1.

The weight of the car upon the bolster 3 is transmitted to the spring-plank 4 and thence through the medium of the levers 5 to the lever 12 and tends to move the same in the direction of the arrow, Fig. 1, so as to apply the brake-shoes to the wheels of the truck, movement of said lever 12 in the opposite direction being effected by connection of the same with the piston of the air-cylinder or other power device with which the car is equipped, the action of said power device tending to raise the spring-plank and bolster, with their load, and thus loosen the brakes.

The slotted plate 30, however, limits the movement of the lever 12 by the power mechanism of the brake, and hence this stop-plate constitutes an important feature of my invention, for if a car happened to be provided with a heavier load at one end than at the other the power mechanism would, in the absence of such stop-plate 30, impart all of its movement to the lever 12 of the truck whose bolster carried the lighter load, with the result that the brakes would not be released from the wheels of the truck whose bolster carried the heavier load. This will be understood on reference to Fig. 7, which illustrates a common form of power device for operating car-brakes. In this figure, 31 represents the power-cylinder, and 32 its piston-rod connected to a lever 33, which is coupled by an adjustable rod 34 to a lever 35, hung to the rear head of the cylinder 31. The lever 33 is connected to the braking devices of one truck, (represented at $x$,) and the lever 35 is connected to the braking devices of the other truck, (represented at $x'$.) If that portion of the car over the truck provided with the braking devices $x$ carried the lighter load, the movement of the piston 32 would, in the absence of the stops 30, move only the lever 33, and hence would release only the braking devices $x$, since the greater resistance to be overcome in order to effect release of the braking devices $x'$ would preclude any operation of the lever 35, and the reverse would be the case if the truck provided with the braking devices $x'$ carried the lighter load. By stopping the movement of each lever 12, however, when such movement represents about one-half of the full travel of the piston in the power-cylinder the first half of said travel must necessarily be devoted to operating the lever 12 of the braking devices of the lighter-loaded truck and the second half of the travel must be devoted to operating the lever 12 of the braking devices of the heavier-loaded truck. Hence the release of the brakes on both trucks by the action of the power device is insured. For instance, when pull is exerted upon the levers 12 of two unequally-loaded trucks of the car it is obvious that the lever of the truck having the lightest load will first respond to the pressure, as it offers the least resistance, and will continue this motion until its stop or check is reached, whereupon any further movement of the power device of the brake will necessarily be transmitted to the lever 12 of the brake of the truck having the heavier load and will serve to move said lever until its stop or check is reached, at which time the car will be lifted to the same extent at each end and the brakes of each truck will be fully released.

In applying the brakes the operation is as follows: As the pressure in the train-pipe or other power device is reduced the lever 12 of the truck bearing the heavier weight will first be moved and will continue to move until it has applied the brakes to the wheels of its truck with a pressure equivalent to the preponderance of weight exerted upon said truck; but thereafter the levers of both trucks, which now offer the same resistance to the power devices of the brake, will respond quickly to any further reduction of pressure, and what is true of the trucks of the individual car will be just as true of the trucks of the cars throughout the train. Hence jostling of the cars due to the disproportionate braking of the wheels of the several cars will be prevented. The person having control of the brakes will not be able to release the brakes of the entire train until sufficient pressure has been exerted to lift the bolster of the heaviest car. This bolster being the last one raised will upon reduction of pressure be the first to descend and will be followed by the bolster having the next lighter load whether that bolster is on the same or on a different car, and so on throughout the train, the last bolster to descend being that having the least load upon it. The result of this will be the correction of excess momenta wherever it may be found throughout the train, thus tending to preserve the equilibrium of the train and obviate much, if not all, of the jostling and jarring which is inseparable from the operation of the present forms of power-brake.

Between a heavily-loaded car partially retarded and an empty car fully retarded the tendency of the former must be to forge ahead, while that of the latter must be to hold back, and this tendency undoubtedly causes many breakaways; but it will be evident that when the motion of each car or of each truck is resisted in proportion to its momentum there will result a harmony of action which will effectually overcome the objection noted. Assuming that just sufficient air is being maintained to hold the brakes off throughout the train, any reduction of said pressure will be followed by an application of said brakes equivalent to said reduction, and each further reduction of pressure will result in further application of the brakes until the restraining pressure has become entirely exhausted, at which time the brakes will be fully applied. Graduation of the braking effect is therefore as complete and as simply effected as under the old straight-air system.

In case of parting of the train the disruption of the hose-couplings will exhaust pressure from the train-pipe, and thus cause the brakes to be applied with full force, and if the air-supply is exhausted the same result will take place, or if the air-supply is insufficient there will be a partial application of the brakes equivalent in extent to such insufficiency.

Sticking of the brakes at stations is prevented by reason of the fact that the brakes are positively forced off by power. Hence failure of the brake-shoes to leave the wheels because of sluggish action of a spring or weight cannot possibly occur.

Having thus described my invention, I claim and desire to secure by Letters Patent—

1. The combination in braking mechanism operated by the weight of the load to apply the brakes and by power mechanism to relieve the brakes, of a stop for arresting the movement of the braking devices when the brake-shoes are properly freed from the wheels, substantially as specified.

2. The combination in braking mechanism operated by the weight of the load to apply the brakes and by power mechanism to release the brakes, of stops for arresting the release movement of the braking devices of each truck of a car, whereby, after the brakes of a truck having the lighter load have been released, further application of power will release the brakes of the truck having the heavier load, substantially as specified.

3. The combination of the primary lever of the braking mechanism of a car-truck, a spring-plank, a spring-supported bolster thereon, and levers hung to the fixed structure of the truck and carrying said spring-plank, said levers being connected to said primary lever of the braking mechanism, substantially as specified.

4. The combination of the primary lever of the braking mechanism of a railway-car, a pair of transverse levers coupled to said primary lever and each forked at its outer end, means for hanging the forked outer ends of the levers to the fixed structure of the car-truck, and means for transmitting the weight of the car to said levers, substantially as specified.

5. The combination of the primary lever of the braking mechanism of a railway-car, a pair of transverse levers, and a triple coupler whereby said transverse levers are connected to the primary lever, substantially as specified.

6. The combination in braking mechanism for railway-car trucks, of the yielding load-carrying member of the truck, a pair of levers coupled at their inner ends to the brake-lever system of the truck, links whereby the outer ends of said pair of levers are hung to the fixed structure of the truck, and rigid connections between said pair of levers and the load-carrying member of the truck, substantially as specified.

7. The combination of the primary lever of the braking mechanism of a car-truck, means for applying power to said lever to move it in one direction, and for applying the weight of the load upon the truck to move it in the opposite direction, and a hanger for said lever consisting of a looped strap, having both upwardly-extending and laterally-extending members secured to the fixed structure of the truck, substantially as specified.

8. The combination of the transoms of the truck, the spring-plank, the spring-supported bolster thereon, levers carrying said spring-plank and connected to the braking mechanism, and stops for limiting the lateral movement of the spring-plank, substantially as specified.

9. The combination of the transoms of the truck, the spring-plank, the spring-supported bolster thereon, levers carrying said spring-plank and connected to the braking mechanism, depending links to which said levers are hung, and reinforcing-plates interposed between said links and the transoms of the truck and serving as stops to limit the lateral movement of the spring-plank, substantially as specified.

In testimony whereof I have signed my name to this specification in the presence of two subscribing witnesses.

WILLIAM L. BARKER.

Witnesses:
F. E. BECHTOLD,
JOS. H. KLEIN.